United States Patent
Lin et al.

(10) Patent No.: US 8,317,332 B2
(45) Date of Patent: Nov. 27, 2012

(54) ADJUSTMENT DEVICE AND PROJECTOR HAVING THE SAME

(75) Inventors: Shiuan-Ting Lin, Hsin-Chu (TW); Hung-Lin Lee, Hsin-Chu (TW); Wei-Ju Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 309 days.

(21) Appl. No.: 12/876,240

(22) Filed: Sep. 7, 2010

(65) Prior Publication Data
US 2011/0128504 A1   Jun. 2, 2011

(30) Foreign Application Priority Data
Nov. 27, 2009   (CN) ............ 2009 1 0246382

(51) Int. Cl.
   *G03B 21/28*   (2006.01)
(52) U.S. Cl. ............ 353/31; 353/98; 353/119; 359/873
(58) Field of Classification Search ............ 353/31, 353/33, 34, 37, 98, 119; 349/5, 7, 8, 9; 359/871, 359/872, 873, 874
See application file for complete search history.

(56) References Cited

U.S. PATENT DOCUMENTS

| 6,494,583 | B2 | 12/2002 | Lu |
| 6,880,934 | B2 * | 4/2005 | Lee ................ 353/31 |
| 7,901,090 | B2 * | 3/2011 | Kao ................ 353/98 |
| 8,210,692 | B2 * | 7/2012 | Yoshimura et al. ......... 353/98 |
| 2010/0085544 | A1 * | 4/2010 | Yoshimura et al. ......... 353/98 |

FOREIGN PATENT DOCUMENTS

| TW | 452093 | 8/2001 |
| TW | 454484 | 9/2001 |
| TW | 472897 | 1/2002 |
| TW | I303011 | 11/2008 |

* cited by examiner

*Primary Examiner* — William C Dowling
(74) *Attorney, Agent, or Firm* — Jianq Chyun IP Office

(57) ABSTRACT

An adjustment device for adjusting an angle of a dichroic mirror of a projector with respect to an optical engine base of the projector is disclosed. The dichroic mirror is pivotably mounted to the optical engine base. The adjustment device includes a link and an eccentric screw. The link has a first end and a second end. The first end is adapted to be fixedly mounted to the dichroic mirror. The second end has an opening. The eccentric screw is adapted to extend through the opening to be screwed to the optical engine base. The eccentric screw includes an eccentric section disposed within the opening. The eccentric section pushes the link such that the link drives the dichroic mirror to pivot with respect to the optical engine base upon rotating of the eccentric screw. A projector including the adjustment device is also disclosed.

18 Claims, 7 Drawing Sheets

ADJUSTMENT DEVICE AND PROJECTOR HAVING THE SAME

CROSS-REFERENCE TO RELATED APPLICATION

This application claims the priority benefit of China application serial no. 200910246382.5, filed on Nov. 27, 2009. The entirety of the above-mentioned patent application is hereby incorporated by reference herein and made a part of this specification.

BACKGROUND OF THE INVENTION

1. Field of the Invention

The invention relates to an adjustment device and a projector having such an adjustment device, and more particularly, to an adjustment device for adjusting the angle of a dichroic mirror of a projector and a projector having such an adjustment device.

2. Description of Related Art

Projectors are a display apparatus for generating images with large size. The image of the projector is produced by using a light valve to convert an illumination beam generated by a light source module into an image beam and a lens module to project the image beam onto a screen or a wall. With advancing of the projecting technology and reducing of fabrication cost, application of projectors has been gradually expanded from commercial use to family use.

The projector typically has a dichroic mirror. The colors of the illumination beam generated by the light source module are separated via the dichroic mirror by reflecting part of the illumination beam or allowing part of the illumination beam to transmit therethrough. In general, the dichroic mirror is fixedly disposed within the optical engine base of the projector. However, inaccurate calculation of the optical path or fabrication tolerance of the optical engine base may cause deviation in the angle of the dichroic mirror, and the deviation in the angle of the dichroic mirror may not be adjusted, so the projection quality of the projector is affected. Taiwan Patent Nos. I303011, 452093, 454884, and 472897 disclose some techniques for adjusting the angle of optical elements.

SUMMARY OF THE INVENTION

Accordingly, the invention is directed to an adjustment device capable of adjusting the angle of a dichroic mirror of a projector.

The invention is also directed to a projector including an adjustment device capable of adjusting the angle of a dichroic mirror of the projector.

In one embodiment, the invention provides an adjustment device adapted to adjust an angle of a dichroic mirror of a projector with respect to an optical engine base of the projector. The dichroic mirror is pivotably mounted to the optical engine base. The adjustment device includes a link and an eccentric screw. The link has a first end and a second end. The first end is adapted to be fixedly mounted to the dichroic mirror. The second end has an opening. The eccentric screw is adapted to extend through the opening to be interlocked with the optical engine base. The eccentric screw includes an eccentric section disposed within the opening. The eccentric section pushes the link such that the link drives the dichroic mirror to pivot with respect to the optical engine base upon rotating of the eccentric screw.

In another embodiment, the invention provides a projector including an optical engine base, at least one light source, at least one dichroic mirror, a light valve, a lens, and an adjustment device. The light source is disposed within the optical engine base and capable of providing an illumination beam. The dichroic mirror is pivotably mounted to the optical engine base and capable of separating colors of the illumination beam. The light valve is disposed within the optical engine base and capable of converting the illumination beam into an image beam. The lens is disposed within the optical engine base and in a light path of the image beam. The lens is capable of projecting the image beam to an outside of the optical engine base to form a picture. The adjustment device includes a link and an eccentric screw. The link has a first end and a second end. The first end is fixedly mounted to the dichroic mirror. The second end has an opening. The eccentric screw extends through the opening to be interlocked with the optical engine base. The eccentric screw includes an eccentric section disposed within the opening. The eccentric section pushes the link such that the link drives the dichroic mirror to pivot with respect to the optical engine base upon rotating of the eccentric screw.

In view of the foregoing, the embodiments of the invention have at least one of the following advantages. The user may rotate the eccentric screw to push the link so as to drive the dichroic mirror to pivot with respect to the optical engine base, thereby adjusting the dichroic mirror to a proper angle and hence ensuring a good projection quality of the projector.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
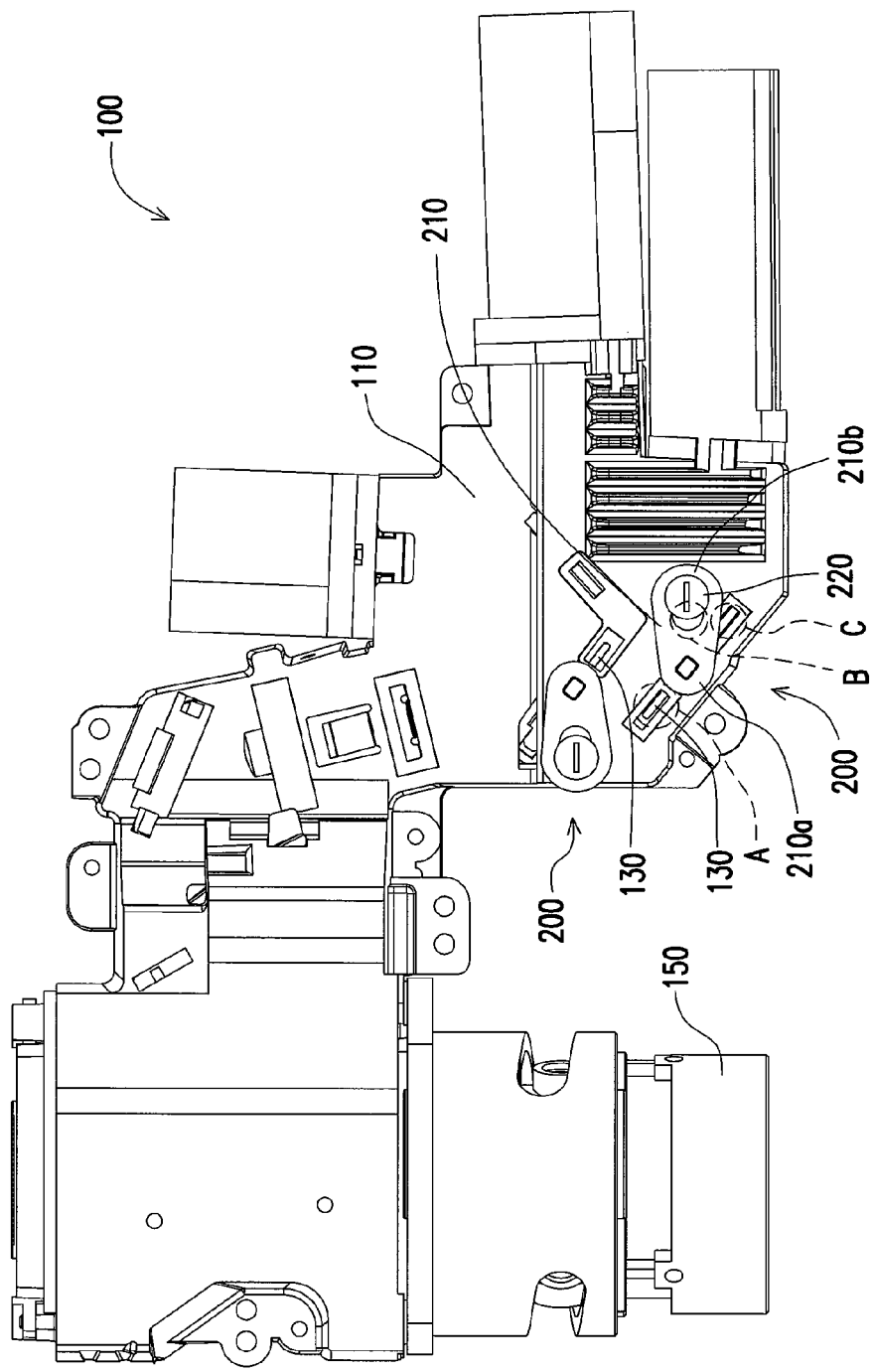
FIG. 1 is a top view of a projector according to one embodiment of the invention.
Figure 2:
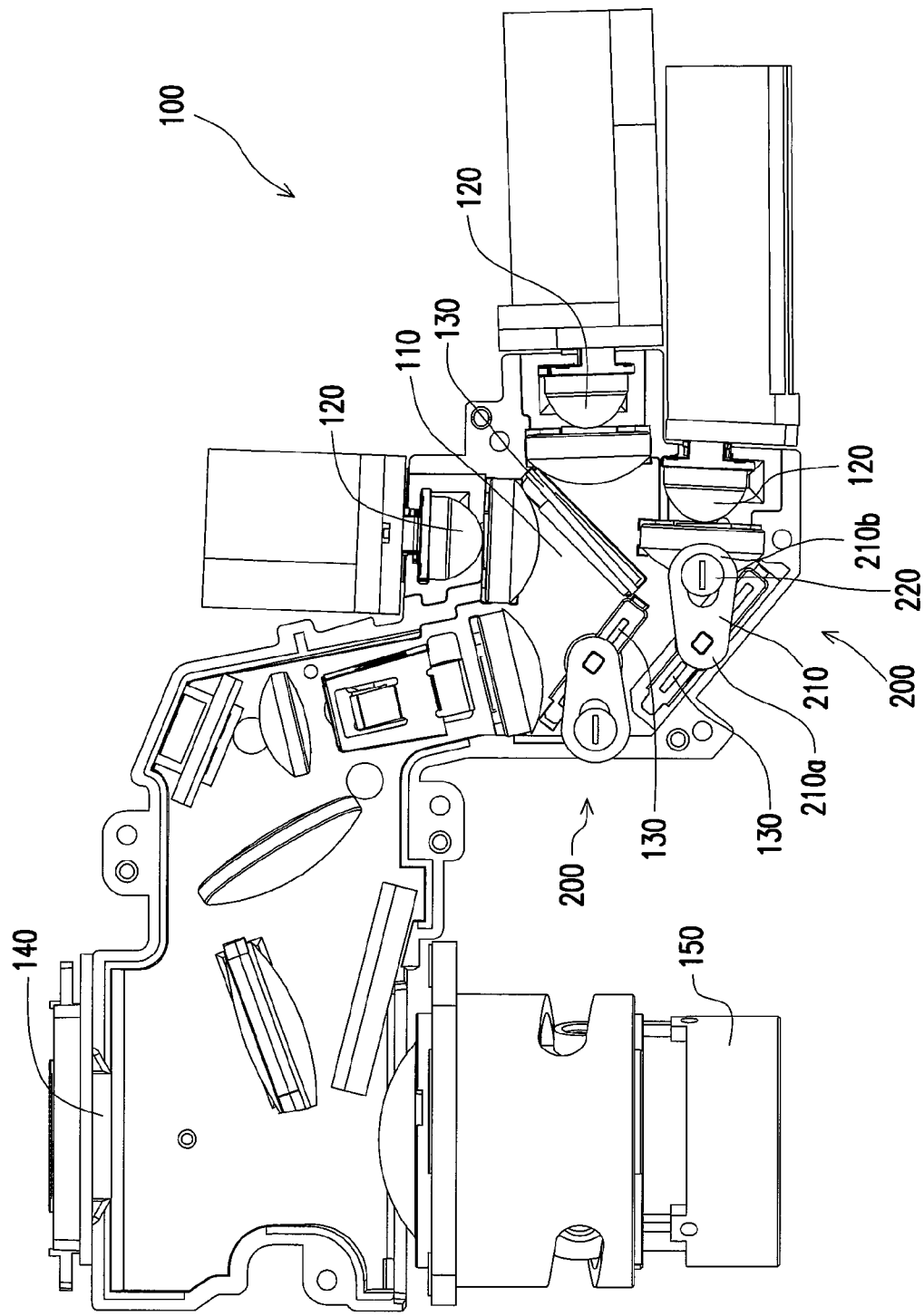
FIG. 2 is a top view of the projector of FIG. 1 with part of the optical engine base removed.
Figure 3:
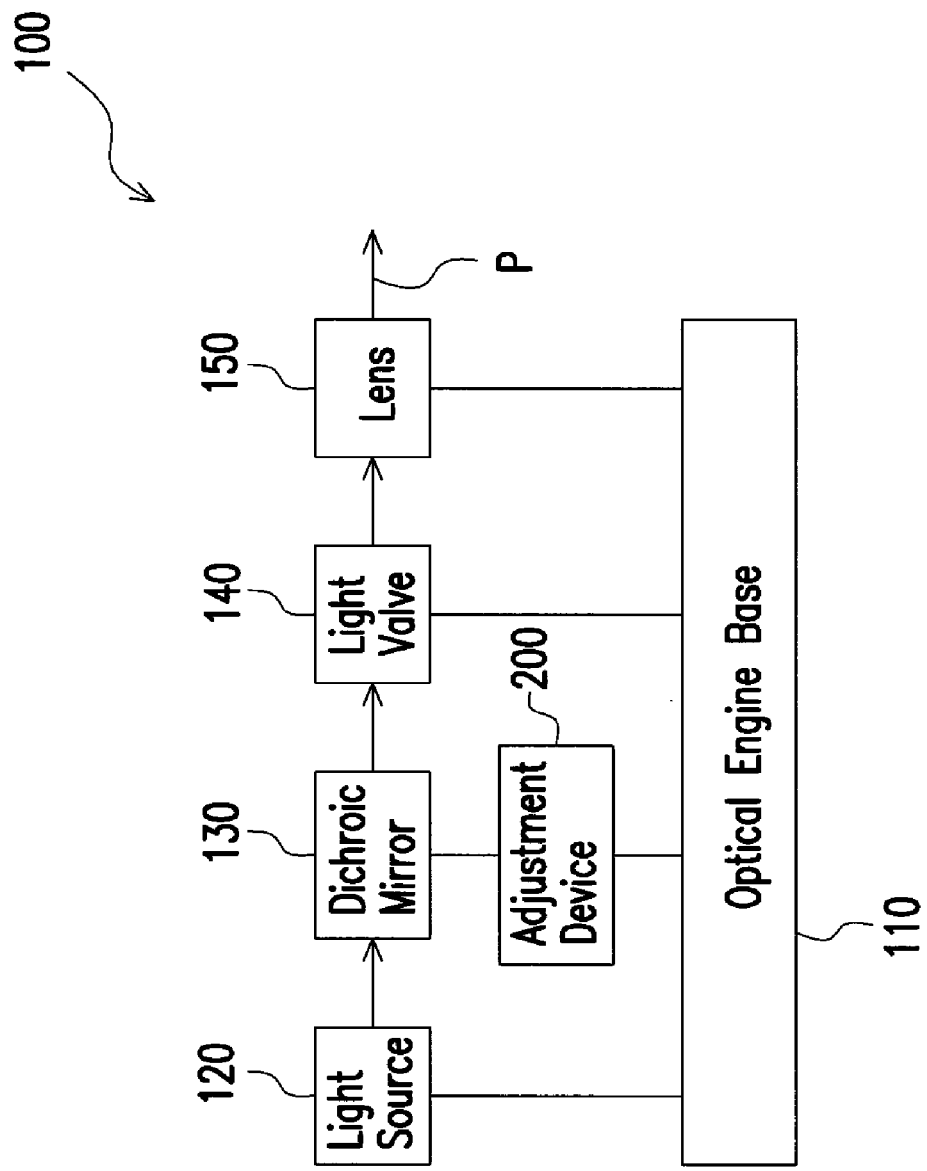
FIG. 3 is a block diagram of the projector of FIG. 1.

Referring to FIGS. 1 to 3, the projector 100 of the embodiment includes an optical engine base 110, light sources 120 (three light sources are illustrated), dichroic mirrors 130 (three dichroic mirrors are illustrated), a light valve 140, and a lens 150. The light source 120 is disposed within the optical engine base 110 and capable of providing an illumination beam. Each dichroic mirror 130 is disposed within the optical engine base 110 and capable of separating colors of the illumination beam. The light valve 140 is disposed within the optical engine base 110 and capable of converting the illumination beam into an image beam. The lens 150 is disposed within the optical engine base 110 and in a light path P of the image beam, and capable of projecting the image beam to an outside of the optical engine base 110 to form a picture.

The dichroic mirrors 130 of the embodiment are pivotably mounted to the optical engine base 110 such that adjustment devices 200 are capable of adjusting an angle of the dichroic mirrors 130 with respect to the optical engine base 110. Referring to FIG. 1 and FIG. 2, each adjustment device 200 (two adjustment devices are illustrated) of the embodiment includes a link 210 and an eccentric screw 220. The link 210 has a first end 210a and a second end 210b, and the first end 210a is adapted to be fixedly mounted to one of the dichroic mirrors 130. The eccentric screw 220 is adapted to extend through the second end 210b to be fastened to the optical engine base 110. Rotating of the eccentric screw 220 may push the link 210 so as to drive the dichroic mirror 130 to pivot with respect to the optical engine base 110.

In the embodiment, two adjustment devices 200 are used to adjust the angle of two of the dichroic mirrors 130 of the projector 100, respectively. However, the number of the adjustment devices 200 is for the purposes of illustration only and should not be regarded as limiting. In other embodiments not illustrated, less or more than two adjustment devices 200 may be used to adjust part or all of the dichroic mirrors 130.

Figure 4:
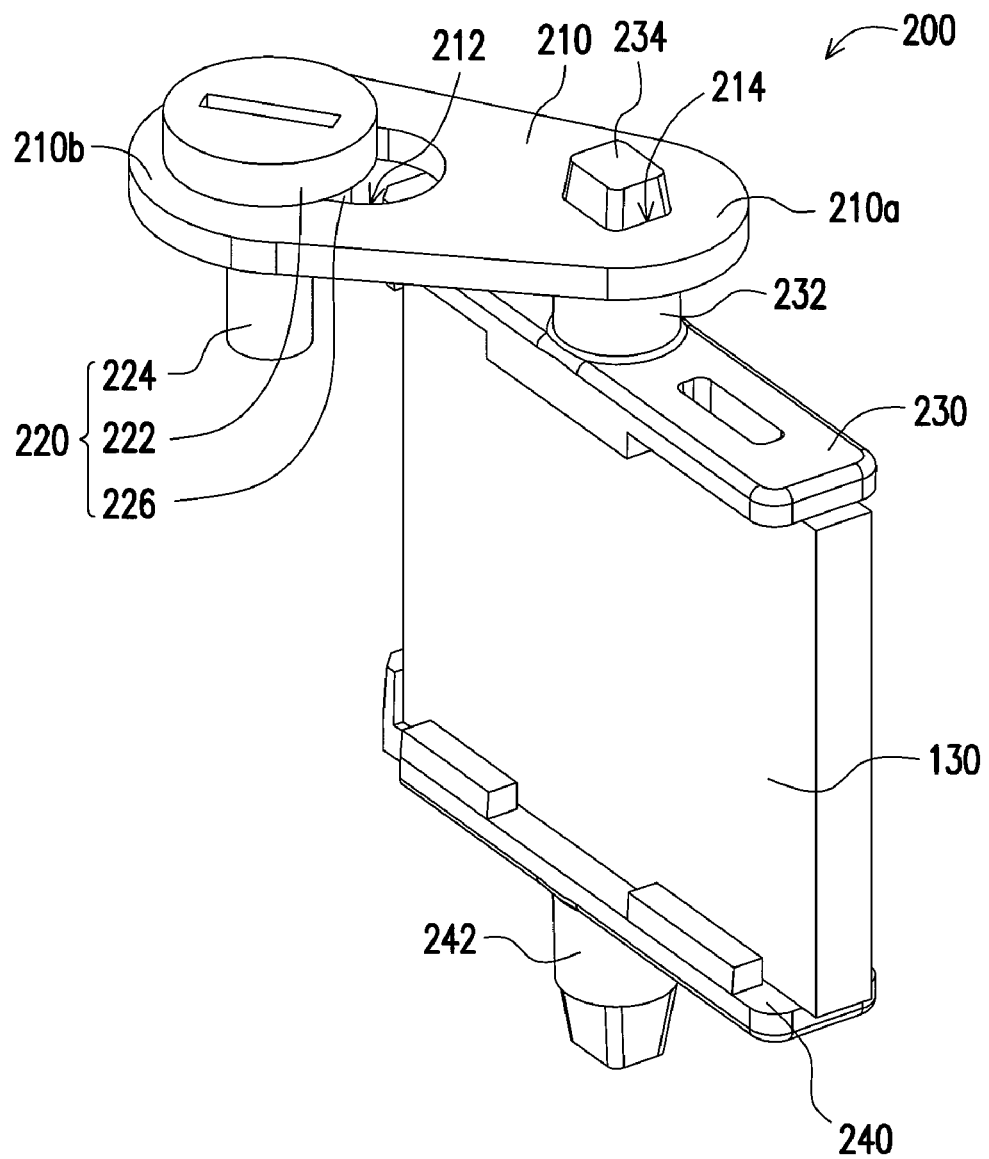
FIG. 4 is a perspective view of the adjustment device of FIG. 1.
Figure 5:
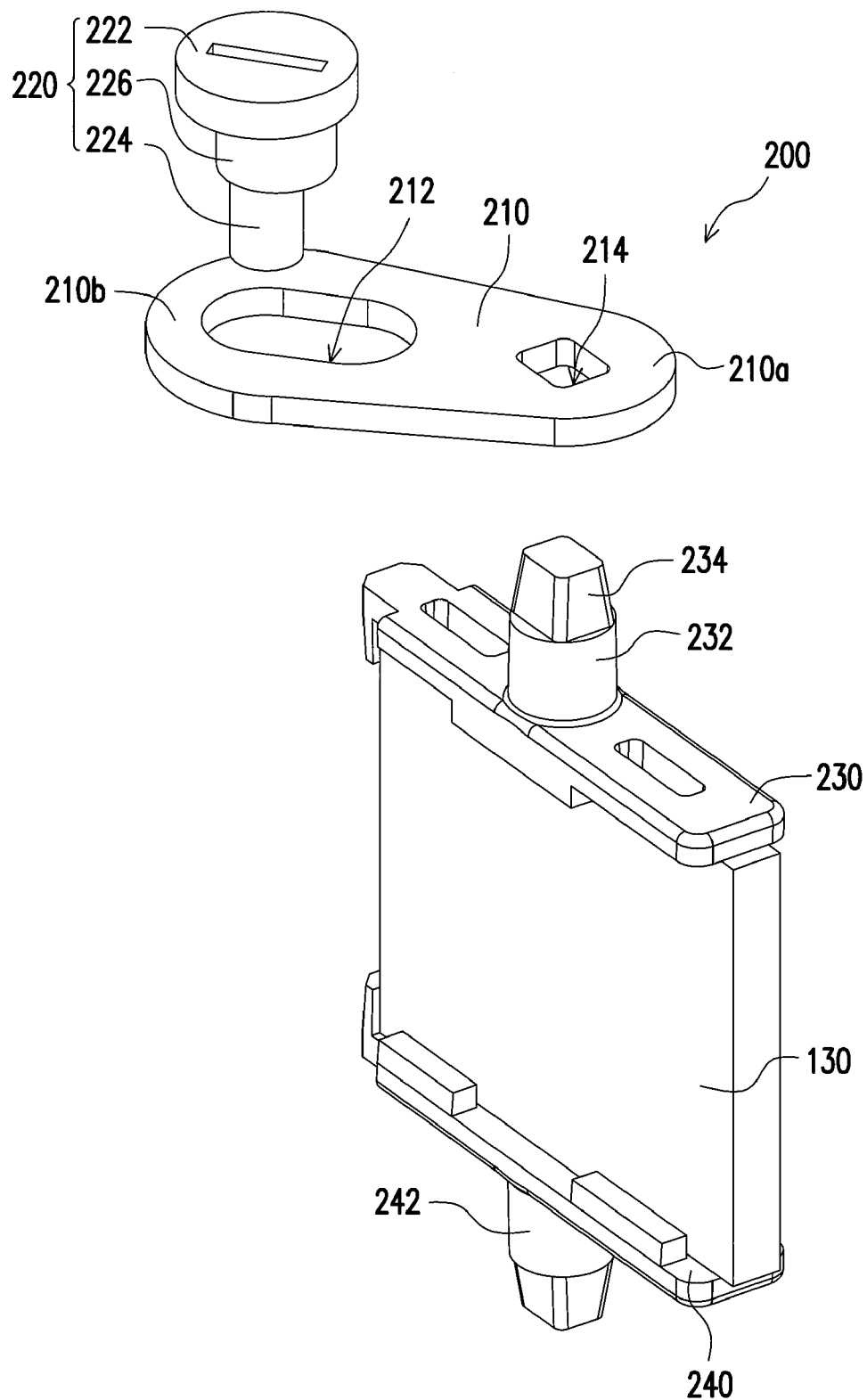
FIG. 5 is an exploded view of the adjustment device of FIG. 4.

Referring to FIG. 4 and FIG. 5, specifically, the eccentric screw 220 of the embodiment includes a head portion 222, a thread section 224, and an eccentric section 226 interconnected between the head portion 222 and the thread section 224. The thread section 224 is adapted to be screwed to the optical engine base 110 (see FIG. 1). The link 210 has an opening 212 at the second end 210b. The eccentric screw 220 extends through the opening 212 such that the eccentric section 226 is disposed within the opening 212. Upon rotating of the eccentric screw 220, the eccentric section 226 pushes the link 210 such that the first end 210a of the link 210 fixed to the dichroic mirror 130 drives the dichroic mirror 130 to pivot with respect to the optical engine base 110.

More specifically, the adjustment device 200 of the embodiment further includes a connecting element 230. The connecting element 230 is fixed to the first end 210a of the link 210 and includes a pivot axle 232. The connecting element 230 is adapted to be fixedly mounted (i.e., glued) to one dichroic mirror 130, and the dichroic mirror 130 is adapted to be pivotably mounted to the optical engine base 110 (as shown in FIG. 1) via the pivot axle 232. Besides, the connecting element 230 includes a tenon 234 and the link 210 includes a mortise 214. The tenon 234 is engagingly received in the mortise 214 to fixedly mount the connecting element 230 and the link 210 together. In the embodiment, the tenon 234 is a quadrangular tenon and the mortise 214 is a quadrangular mortise such that the tenon 234 received in the mortise 214 may not pivot with respect to the link 210, thus facilitating the link 210 driving the dichroic mirror 130 to rotate.

In addition, the adjustment device 200 of the embodiment further includes another connecting element 240. The connecting element 240 is fixedly mounted (i.e. glued) to a bottom of the dichroic mirror 130 and is pivotably mounted to the optical engine base 110 (as shown in FIG. 1) via a pivot axle 242 of the connecting element 240. The dichroic mirror 130 may be stably pivotably mounted to the optical engine base 110 by the connecting element 230 and the connecting element 240 fixed to the top and the bottom of the dichroic mirror 130, respectively.

The invention is not intended to limit the tenon 234 and the mortise 214 to any shape described herein. Besides the quadrangular shape, the tenon 234 and the mortise 214 may be of another non-circular shape so as to fixedly mount the connecting element 230 and the link 210 together. Moreover, while the tenon 234 extends from the link 232 in the illustrated embodiment, the invention is not limited here. Rather, in other embodiments not illustrated, the tenon 234 may be positioned at any location on the connecting element 230.

Figure 6A:
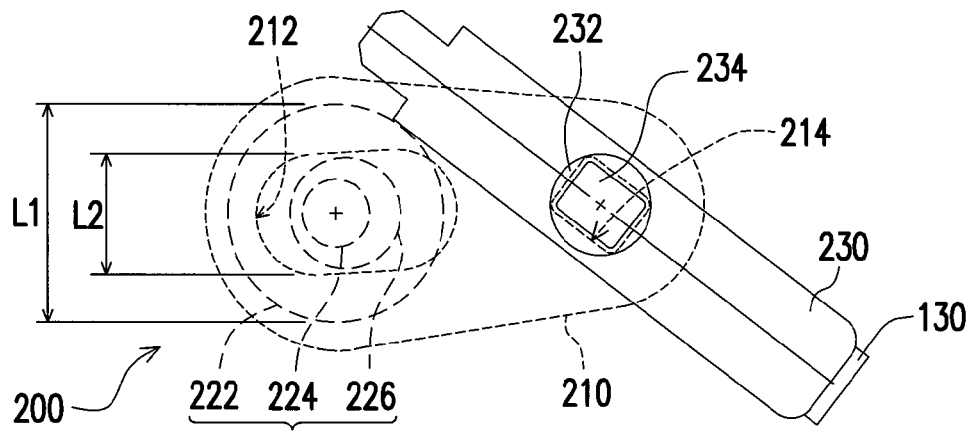
FIGS. 6A to 6C are top views of the adjustment device of FIG. 1 during operation.
Figure 6B:
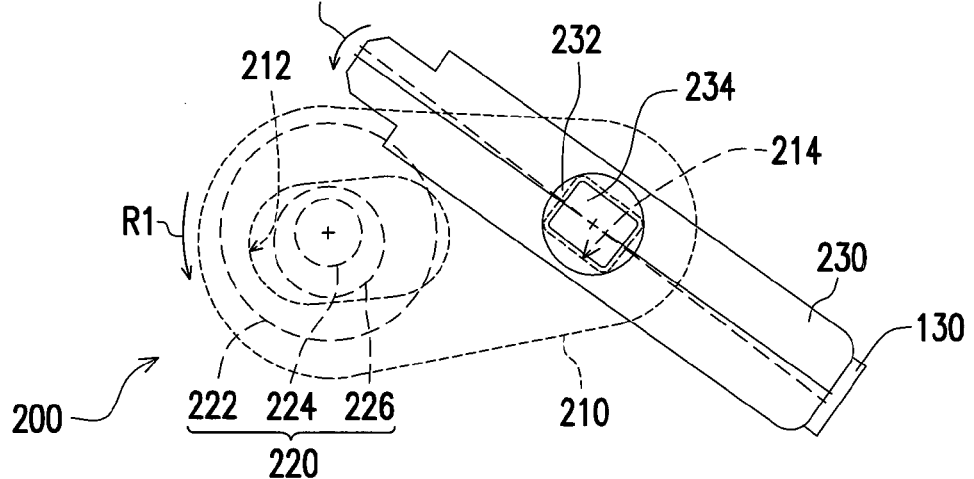

To adjust the angle of the dichroic mirror 130, the eccentric screw 220 may be rotated from the state shown in FIG. 6A to the state shown in FIG. 6B such that the eccentric section 226 of the eccentric screw 220 drives the link 210 to pivot from the state shown in FIG. 6A to the state shown in FIG. 6B in a direction R1. The link 210 drives the dichroic mirror 130 to pivot from the state shown in FIG. 6A to the state shown in FIG. 6B in a direction r1, thereby adjusting the dichroic mirror 130 to a proper angle.

Figure 6C:
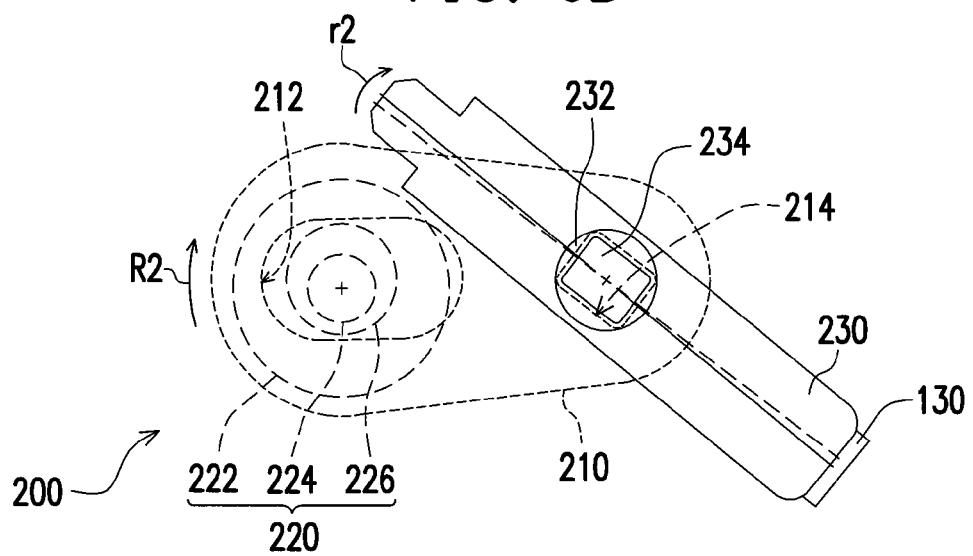

Similarly, the user may also rotate the eccentric screw 220 from the state shown in FIG. 6A to the state shown in FIG. 6C such that the eccentric section 226 of the eccentric screw 220 drives the link 210 to pivot from the state shown in FIG. 6A to the state shown in FIG. 6C in a direction R2. The link 210 drives the dichroic mirror 130 to pivot from the state shown in FIG. 6A to the state shown in FIG. 6C in a direction r2, thereby adjusting the dichroic mirror 130 to a proper angle.

Referring also to FIG. 5, in particular, the eccentric section 226 of the embodiment is, for example, a cylinder and eccentrically connected between the head portion 222 and the thread section 224 to operate like a cam to drive the link 210. In addition, referring to FIG. 6A, in the embodiment, the outer diameter L1 of the head portion 222 of the eccentric screw 210 is greater than the inner diameter L2 of the opening 212, such that the link 210 is restrained between the head portion 222 and the optical engine base 110 (shown in FIG. 1). As shown in FIG. 1, after adjustment of the dichroic mirror 130 is completed, the link 210, the connecting element 230

(shown in FIG. 4) and the eccentric screw 220 may be glued to the optical engine base 110 by injecting glue to a spot A, a spot B, and a spot C, to secure the angle of the dichroic mirror 130 with respect to the optical engine base 110.

Figure 7A:
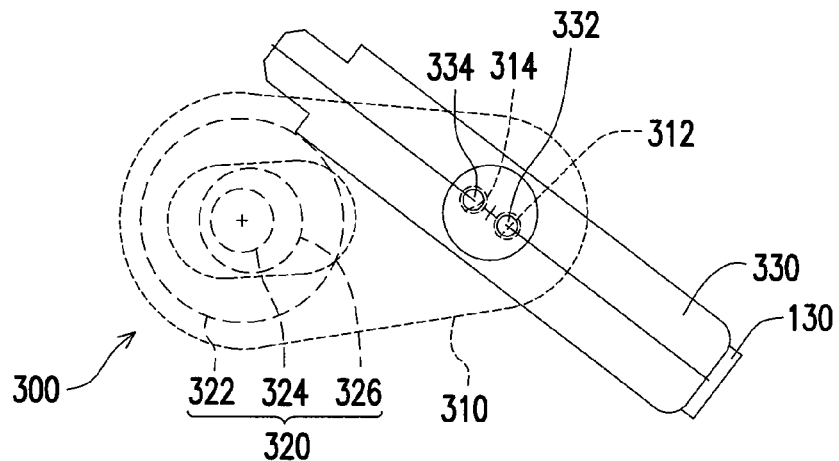
FIGS. 7A to 7C are top views of the adjustment device according to another embodiment of the invention during operation.

Referring to FIG. 7A, different from FIG. 6A in which the link 210 and the connecting element 230 are fixedly mounted together by the tenon 234 engagingly received in the mortise 214, the link 310 of the adjustment device 300 of the embodiment has a hole 312 and a hole 314, and the connecting element 330 has a protrusion 332 and a protrusion 334. The protrusion 332 and the protrusion 334 extend into the hole 312 and the hole 314 to fixedly mount the link 310 to the connecting element 330.

More specifically, the protrusion 332 and the protrusion 334 of the embodiment may be columns in shape and mutually restrain the freedom of rotation with respect to the link 310 to fix the connecting element 330 to the link 310. In addition, in the embodiment, the outer diameter of the protrusion 332 is substantially equal to the diameter of the hole 312, and the outer diameter of the protrusion 334 is substantially equal to the diameter of the hole 314, such that the connecting element 330 may be stably mounted to the link 310.

Figure 7B:
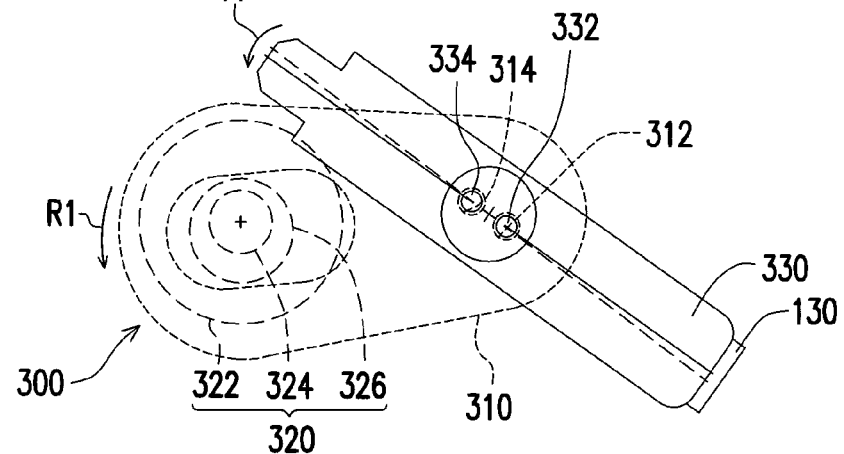

The heat portion 322, a thread section 324, and a eccentric section 326 of the eccentric screw 320 of the embodiment are constructed and connected in a similar manner as described with respect to the heat portion 222, the thread section 224, and the eccentric section 226 of the eccentric screw 220 and therefore explanation thereof is not repeated herein. To adjust the angle of the dichroic mirror 130, the eccentric screw 320 may be rotated from the state shown in FIG. 7A to the state shown in FIG. 7B, such that the eccentric section 326 of the eccentric screw 320 drives the link 310 to pivot from the state shown in FIG. 7A to the state shown in FIG. 7B in a direction R1. The link 310 thus drives the dichroic mirror 130 to pivot from the state shown in FIG. 7A to the state shown in FIG. 7B in a direction r1, thereby adjusting the dichroic mirror 130 to a proper angle.

Figure 7C:
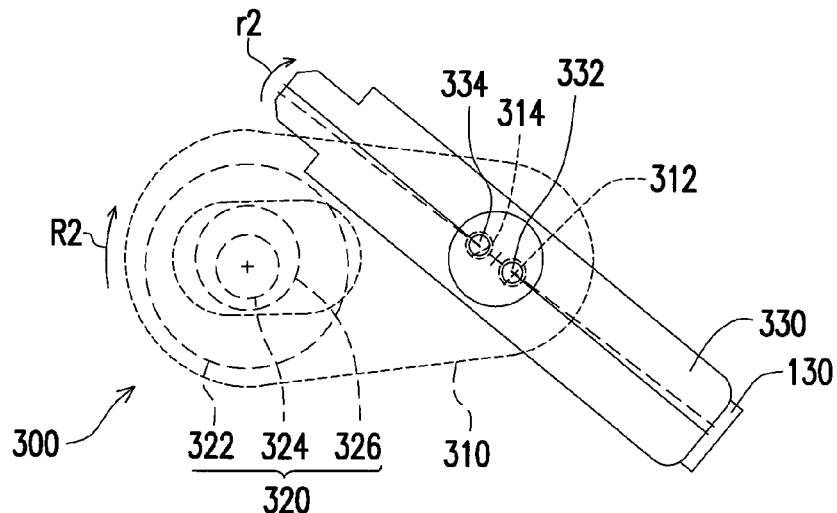

Similarly, the user may also rotate the eccentric screw 320 from the state shown in FIG. 7A to the state shown in FIG. 7C such that the eccentric section 326 of the eccentric screw 320 drives the link 310 to pivot from the state shown in FIG. 7A to the state shown in FIG. 7C in a direction R2. The link 310 drives the dichroic mirror 130 to pivot from the state shown in FIG. 7A to the state shown in FIG. 7C in a direction r2, thereby adjusting the dichroic mirror 130 to a proper angle.

In summary, the embodiments of the invention have at least one of the following advantages. The user may rotate the eccentric screw to push the link so as to drive the dichroic mirror to pivot with respect to the optical engine base, thereby adjusting the dichroic mirror to a proper angle and hence ensuring a good projection quality of the projector. In addition, after adjustment of the dichroic mirror is completed, the angle of the dichroic mirror with respect to the optical engine base may be secured by gluing, thereby avoiding any angle variance of the dichroic mirror due to touch on the eccentric screw erroneously.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjustment device adapted to adjust an angle of a dichroic mirror of a projector with respect to an optical engine base of the projector, the dichroic mirror being pivotably mounted to the optical engine base, the adjustment device comprising:
   a link comprising a first end and a second end, the first end adapted to be fixedly mounted to the dichroic mirror, the second end having an opening; and
   an eccentric screw adapted to extend through the opening to be interlocked with the optical engine base, the eccentric screw comprising an eccentric section disposed within the opening, wherein the eccentric section pushes the link such that the link drives the dichroic mirror to pivot with respect to the optical engine base upon rotating of the eccentric screw.

2. The adjustment device of claim 1, wherein the eccentric screw further comprises a head portion and a thread section, the eccentric section is interconnected between the head portion and the thread section, the thread section is adapted to be screwed to the optical engine base, and the link is disposed between the head portion and the optical engine base.

3. The adjustment device of claim 2, wherein the outer diameter of the head portion is greater than the inner diameter of the opening.

4. The adjustment device of claim 1, further comprising:
   a connecting element fixedly mounted to the first end of the link and comprising a pivot axle, wherein the connecting element is adapted to be fixedly mounted to the dichroic mirror, and the dichroic mirror is adapted to be mounted to the optical engine base via the pivot axle.

5. The adjustment device of claim 4, wherein the connecting element comprises a tenon, the link comprises a mortise, and the tenon is engagingly received in the mortise.

6. The adjustment device of claim 5, wherein the tenon extends from the pivot axle.

7. The adjustment device of claim 4, wherein the connecting element comprises a first protrusion and a second protrusion, the link has a first hole and a second hole, and the first protrusion and the second protrusion extend into the first hole and the second hole, respectively.

8. The adjustment device of claim 7, wherein the outer diameter of the first protrusion is substantially equal to the diameter of the first hole, and the outer diameter of the second protrusion is substantially equal to the diameter of the second hole.

9. The adjustment device of claim 4, further comprising:
a glue gluing the connecting element to the optical engine base to secure the angle of the dichroic mirror with respect to the optical engine base after adjustment of the dichroic mirror is completed.

10. A projector comprising:
an optical engine base;
at least one light source disposed within the optical engine base and capable of providing an illumination beam;
at least one dichroic mirror pivotably mounted to the optical engine base and capable of separating colors of the illumination beam;
a light valve disposed within the optical engine base and capable of converting the illumination beam into an image beam;
a lens disposed within the optical engine base and in a light path of the image beam, the lens capable of projecting the image beam to an outside of the optical engine base to form a picture; and
an adjustment device comprising:
a link comprising a first end and a second end, the first end fixedly mounted to the dichroic mirror, the second end having an opening; and
an eccentric screw extending through the opening to be interlocked with the optical engine base, the eccentric screw comprising an eccentric section disposed within the opening, wherein the eccentric section pushes the link such that the link drives the dichroic mirror to pivot with respect to the optical engine base upon rotating of the eccentric screw.

11. The projector of claim 10, wherein the eccentric screw further comprises a head portion and a thread section, the eccentric section is interconnected between the head portion and the thread section, the thread section is screwed to the optical engine base, and the link is disposed between the head portion and the optical engine base.

12. The projector of claim 11, wherein the outer diameter of the head portion is greater than the inner diameter of the opening.

13. The projector of claim 10, wherein the adjustment device further comprises:
a connecting element fixedly mounted to the first end of the link and comprising a pivot axle, wherein the connecting element is fixedly mounted to the dichroic mirror, and the dichroic mirror is mounted to the optical engine base via the pivot axle.

14. The projector of claim 13, wherein the connecting element comprises a tenon, the link comprises a mortise, and the tenon is engagingly received in the mortise.

15. The projector of claim 14, wherein the tenon extends from the pivot axle.

16. The projector of claim 13, wherein the connecting element comprises a first protrusion and a second protrusion, the link has a first hole and a second hole, and the first protrusion and the second protrusion extend into the first hole and the second hole, respectively.

17. The projector of claim 16, wherein the outer diameter of the first protrusion is substantially equal to the diameter of the first hole, and the outer diameter of the second protrusion is substantially equal to the diameter of the second hole.

18. The projector of claim 13, wherein the adjustment device further comprises:
a glue gluing the connecting element to the optical engine base to secure the angle of the dichroic mirror with respect to the optical engine base after adjustment of the dichroic mirror is completed.

* * * * *